United States Patent Office
3,228,628
Patented Jan. 11, 1966

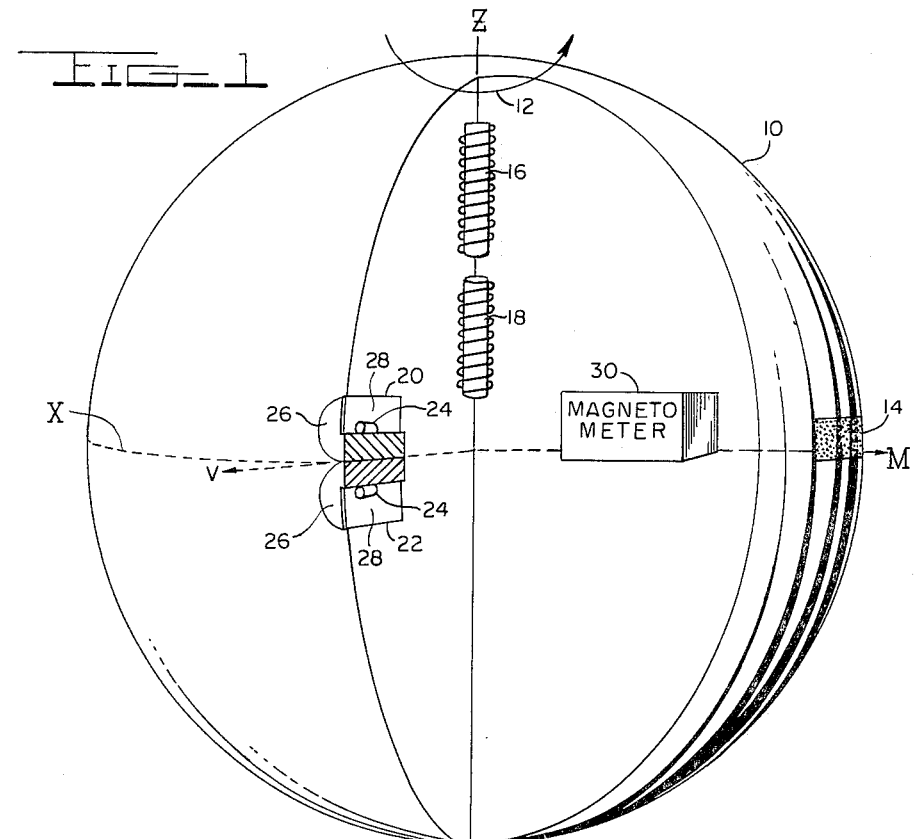
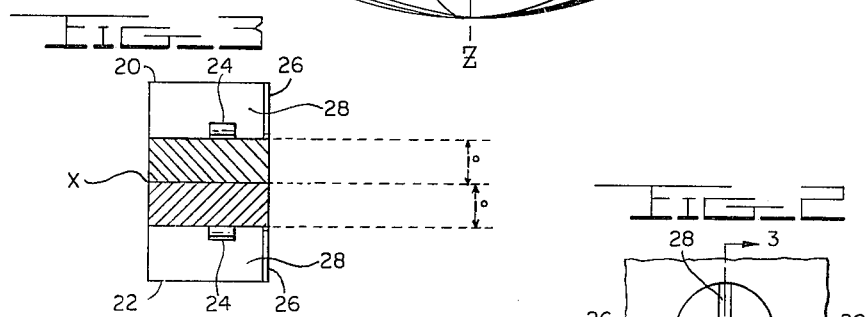
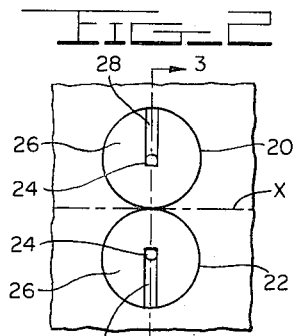
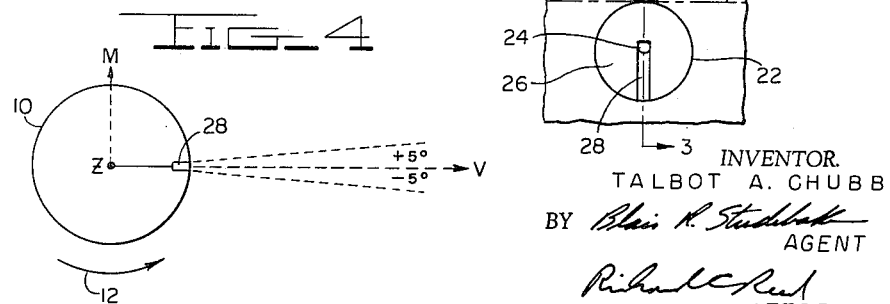
INVENTOR.
TALBOT A. CHUBB
BY
AGENT
ATTORNEY

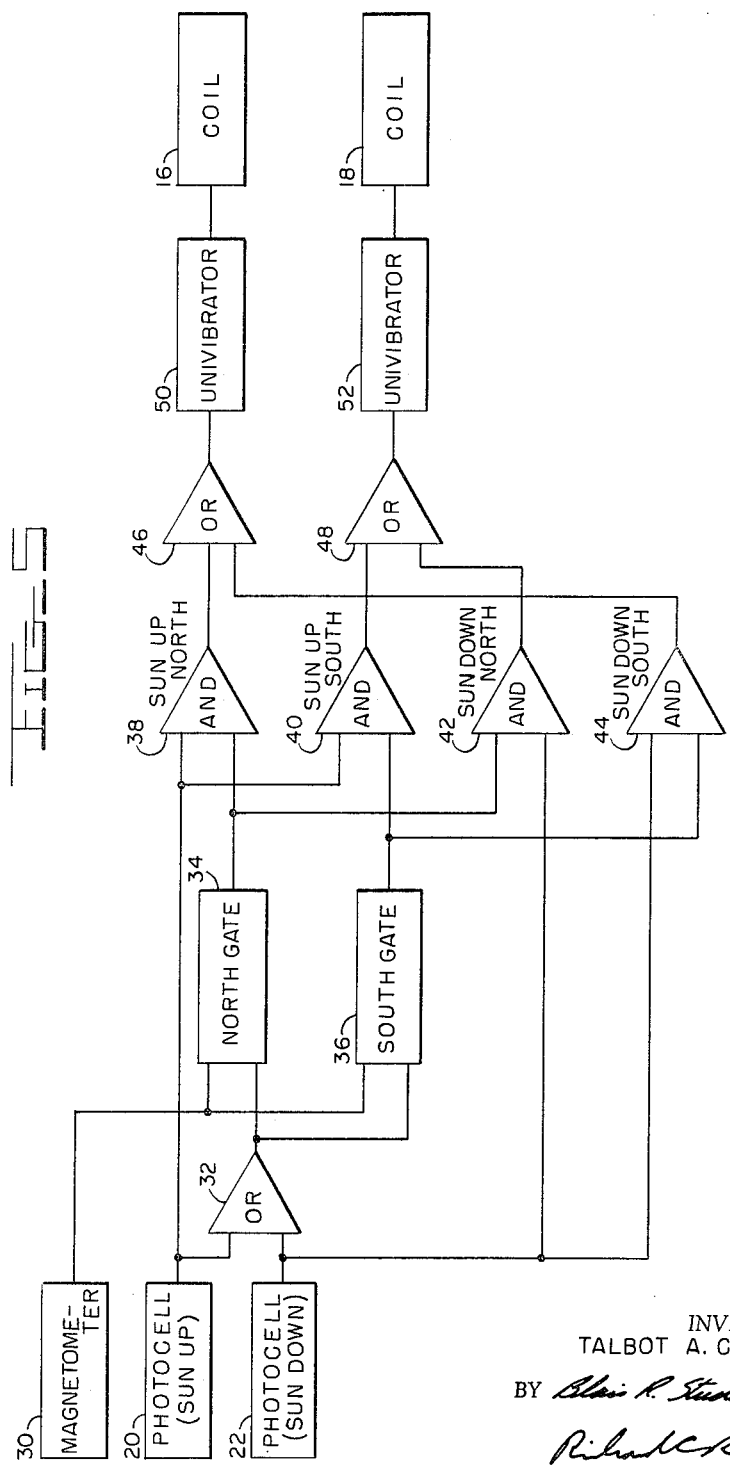

3,228,628
METHOD AND APPARATUS FOR MAGNETICALLY
ORIENTING A SPACE VEHICLE
Talbot A. Chubb, Arlington, Va., assignor to the United
States of America as represented by the Secretary of
the Navy
Filed Apr. 30, 1963, Ser. No. 277,056
11 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to the method and apparatus for controlling a vehicle in space, and more particularly to a simple computer logic circuit for controlling a magnetic moment device in response to sensed conditions for applying correction torques to a spinning space vehicle.

Space orbiting vehicles of the type used to study and observe the space environment can be divided into three categories, those that have no attitude control, those that are maintained stabilized in a zero spin condition, and those which are partially stabilized by spin. For some purposes spin stabilization is to be preferred to complete stabilization, in that spin stabilization provides in simple fashion a predictable sampling of orientations. As a result a view in one direction may be conveniently compared with a view in another direction. For example, if one is studying X-ray radiation from the sun and if one uses directional radiation detectors which look out from the satellites in a direction perpendicular to the satellite spin axis, then X-ray radiation originating in the sun is distinguishable from Van Allen belt background radiation, since X-ray radiation originating in the sun is seen only when the detector looks at the sun, whereas the Van Allen belt background radiation comes from all directions or comes predominantly from directions contained in a plane perpendicular to the earth's magnetic field. Thus the time variation of the radiation detector output permits the desired directional signal to be distinguished from interfering background.

For the advantages of spinning satellites to be fully realized, however, it is necessary to guarantee that the satellite spin axis is properly oriented relative to the direction from which the desired signal is arriving. For example, in the case of X-ray radiation from the sun, it is necessary that the spin axis of the satellite be roughly perpendicular to the vector direction defined by a line between the center of the satellite and the sun. Furthermore, while there are various known approaches for providing corrective torques to provide orientation of non-spinning space vehicles, methods have not been heretofore detailed for providing corrective torques to control the orientation of the spin axis of a spinning space vehicle.

Accordingly, it is an object of the present invention to provide a device for applying corrective torques to a spinning space vehicle.

Another object of this invention is to provide a method for maintaining the spin axis of a spinning space vehicle perpendicular to a vector direction defined by a line between the sun and the equator of the spinning satellite.

Still another object of this invention is to provide improved and simplified means for controlling the application of corrective magnetic torques to a space vehicle in response to correction signals derived from vehicle attitude detection devices.

A further object of the present invention is the provision of a method by which the orientation of a spinning satellite relative to the sun can be automatically controlled.

A still further object of this invention is to provide a magnetic torquing controller to maintain the spin axis of a spinning satellite perpendicular to the satellite-sun line to an accuracy of about three degrees.

The foregoing objects are accomplished in the illustrated embodiment of the present invention by sensing the relationship of the earth's magnetic field to a vector perpendicular to the spin axis of the satellite, sensing the relationship of the equatorial plane of the satellite with a vector direction defined by a line from the satellite to the sun and applying a corrective torque to the spin axis in the direction indicated to be necessary by the sensed relationships to precess the spin axis to a position whereby it is perpendicular to an imaginary line connecting the satellite and the sun.

These and other objects along with many of the attendant advantages of the present invention will become increasingly apparent and more readily appreciated as the same are better understood when the following detailed description is considered in connection with the accompanying drawings wherein:

FIG. 1 is a diagrammatic view of a space vehicle displaying the geometrical relationship of the various elements of the present invention.

FIG. 2 is a front view of the photocell arrangement of the present invention.

FIG. 3 is a sectional view taken along the line 3—3 of FIG. 2.

FIG. 4 is a diagrammatic top view of a satellite displaying the sensing aperture.

FIG. 5 is a schematic diagram of the logic circuit employed in the present invention.

Referring now in detail to the drawings, wherein like reference characters represent like parts throughout the several views, and more particularly to FIG. 1, there is shown a spherical space vehicle generally designated 10 which spins around its Z axis in the direction indicated at 12. Earth satellite 10 carries along its equator, at the outer surface thereof, scientific equipment generally designated 14, for acquiring data relative to the environment in which it is orbiting, e.g., radiation from the sun. A pair of oppositely wound torquing coils 16 and 18 are located along the Z or spin axis of the satellite and each includes a conventional magnetic rod such as a ferromagnetic core with a winding therearound. The torquing coils may be positioned anywhere within the vehicle so long as their longitudinal axes are parallel with the spin axis of the satellite.

The sun position sensing elements of the present invention are an Up photocell 20 and a Down photocell 22 located adjacent each other in each side of the equatorial plane of the satellite and along a vector V. Photocells 20 and 22 each consist of a silicon photodiode 24 mounted slightly behind a reticle plate 26 which is cut out at 28 to permit sunlight to fall on the diode aperture of photocell 20 only when the sun is above the equatorial plane X by more than one degree and on the diode aperture of photocell 22 only when the sun is below the equatorial plane by more than one degree (FIG. 3). The openings 28 further restrict the receipt of sunlight by the diodes 24 to only those instances when the sun is within ±5° of a plane defined by the Z axis and vector V as shown in FIG. 4.

A flux gate magnetometer 30 is mounted within the satellite on a vector M which is perpendicular to the V-Z plane. When on the ground, magnetometer 30 will produce a +2.5 volt signal when vector M points along the earth's magnetic field line in a direction toward the earth's North magnetic pole and a −2.5 volt signal vector M points along the earth's magnetic field line in a direction leading to the earth's South magnetic pole. In flight magnetometer 30 will produce a continuously varying signal ranging from +2.5 volts to −2.5 volts with 0 volts being produced when vector M is exactly perpendicular to the earth's magnetic field.

Referring now to FIG. 5 there is shown the logic circuit employed by the present invention to selectively provide a pulse in coil 16 or coil 18. The output of flux gate magnetometer 30 is transmitted to conventional "AND" gates 34 and 36 which are designated North gate and South gate, respectively. The North gate 34 is responsive only to positive voltages in excess of +0.8 volt from magnetometer 30 while the South gate 36 is responsive only to negative voltages in excess of −0.8 volt. Photocells 20 and 22 are also connected to the North gate 34 and the South gate 36 through a conventional "OR" circuit 32. "OR" circuit 32 will transmit a pulse to both the North gate 34 and South gate 36 upon receipt of a signal from either the Up photocell 20 or the Down photocell 22. A battery of four conventional "AND" gate circuits 38, 40, 42, and 44 are included in the circuit to receive pulses from the North gate 34 and the South gate 36. "AND" gates 38 and 42 are connected to the output of North gate 34 and "AND" gates 40 and 44 are connected to the output of South gate 36.

When the output of magnetometer 30 is between +0.8 and +2.5 volts and North gate 34 receives a pulse from "OR" circuit 32 the North gate will be opened and a pulse transmitted to each of "AND" gates 38 and 42. When the output of magnetometer 30 is between +0.8 and −0.8 volt neither the North gate nor the South gate will produce a pulse regardless of the simultaneous receipt of pulses from "OR" circuit 32. When the output of magnetometer 30 is between −0.8 and −2.5 volts and a pulse is concurrently received by South gate 36 from "OR" circuit 32 the South gate will then transmit a pulse to "AND" gates 40 and 44. "AND" gates 38 and 40 also receive input signals from Up photocell 20 while "AND" gates 42 and 44 receive a second signal from Down photocell 22. When one of the gate circuits 38, 40, 42, or 44 simultaneously receives signals at both of its inputs the gate will be opened and a pulse transmitted therefrom.

It will be apparent from the portion of the logic circuit of FIG. 5 just described that each of the four possible combinations of orientations between the equatorial plane of the satellite and the sun, and the earth's magnetic field and the magnetometer will cause a selected one of the "AND" gates 38–44 to transmit a pulse. Of course, this is not true when the magnetometer is pointed substantially perpendicular to the earth's magnetic field and the output thereof is between +0.8 volt and −0.8 volt, this, however, will be an infrequent occurrence during normal satellite travel.

Output pulses from "AND" gates 38 and 44 are transmitted to a conventional "OR" circuit 46 which, upon receipt of a pulse from either "AND" gate 38 or 44 will transmit a pulse to univibrator 50. Similarly, output pulses from "AND" gates 40 and 42 are transmitted to a conventional "OR" circuit 48 which upon receipt of a pulse from either "AND" gate 42 or 44 transmits a pulse to univibrator 52. The term "univibrator," as used here to describe circuits 50 and 52, refers to a conventional monostable multivibrator or "one-shot" multivibrator. The univibrators 50 and 52 of the present invention are designed to produce and transmit a rectangular pulse of approximately 10 seconds duration to oppositely wound coils 16 and 18, respectively.

The producing of a current flow in coil 16 by univibrator 50 will produce a magnetic field parallel to the longitudinal axis of the coil core and hence parallel to the Z or spin axis of the satellite. This magnetic field will interact with the earth's magnetic field to produce a force couple on the core, and hence, an effective torquing force on the spin axis of the space vehicle causing the spin axis to precess toward the desired position, coil 18, being wound oppositely to coil 16, will produce the same type of torquing force on the spin axis but the axis will be precessed in the opposite direction.

For an example of the operation, consider the instantaneous position of the sun to be above the equatorial plane of the satellite and the magnetometer to be aligned in approximately the North direction along the earth's magnetic field as vector V and photocells 20 and 22 scan the sun for approximately 10 degrees of rotation. In this position, due to the altitude, the magnetometer will be transmitting slightly less than +2.5 volts, but considerably more than +0.8 volt to the North and South gate circuits. In the position only North gate 34 will be open, South gate 36 not being responsive to positive voltages. The North gate will consequently transmit a pulse to "AND" gates 38 and 42 and with the sun above the satellite's equatorial plane, Up photocell 20 will transmit a signal to "AND" gates 38 and 40. "AND" gate 38, being the only one receiving the required two signals to cause a pulse to be sent therethrough, will actuate "OR" gate 46 and univibrator 50 to cause coil 16 to place a corrective torque on the satellite spin axis. It will be apparent then that with each spin revolution, either the Up photocell 20 or the Down photocell 22 will "see" the sun and either coil 16 or 18 will be activated, depending on the position of the magnetometer with respect to the earth's magnetic field at the time the sun is scanned. Of course, once the satellite has been torqued to a position where the satellite equatorial plane is in line with the satellite-sun line the system will not operate because of the 2–3 degree dead space shown in FIG. 3 where neither of the photocells are able to "see" the sun. However, the slightest slip or deviation of the spin axis from a position perpendicular to satellite sun line will cause that axis to be immediately torqued back to the desired position upon the sensing of such deviation or slap by either of the photocells.

As can be seen from the foregoing, the present invention provides a quick and comparatively simple system for orienting and maintaining a satellite's spin axis normal to a satellite-sun line without the exertion of outside forces on the space vehicle and provides further for the taking of accurate data regarding the sun and its radiations by other test equipment located on the satellite surface without regard to inaccuracies produced through improper orientation of the vehicle.

Obviously many modifications and variations of the present invention are possible in light of the above teachings. It is therefore to be understood that the scope of this invention is to be limited only by the appended claims and not otherwise.

What is claimed is:

1. A system for controlling the orientation of the axis of rotation of a spinning space vehicle with respect to a vector direction comprising:
 (a) first means for sensing the relationship of a vector within said vehicle to the earth's magnetic field,
 (b) second means for sensing the relationship of the equatorial plane of said vehicle to said vector direction,
 (c) electronic circuit means for providing separate electrical outputs in response to said sensed relationships, and
 (d) coil means for applying a torquing force to said space vehicle in response to said electrical outputs whereby said axis of rotation is moved to a position substantially perpendicular to said vector direction.

2. A system for controlling the orientation of the axis of rotation of a spinning space vehicle with respect to a line between the vehicle and the sun comprising:
 (a) first means for sensing the relationship of a vector within said vehicle to the earth's magnetic field,
 (b) second means for sensing the relationship of the equatorial plane of said vehicle to a line between the vehicle and the sun, (c) electronic circuit means for providing separate electrical outputs in response to said sensed relationships, and (d) coil means for applying a torquing force to said space vehicle in response to said electrical outputs whereby said axis of rotation is moved to a position substantially perpendicular to a line betwen the vehicle and the sun.

3. A system for controlling the orientation of the axis of rotation of a spinning satellite with respect to a line between the satellite and the sun comprising:

(a) magnetic means for sensing the relationship of said satellite to the earth's magnetic field, (b) photocell means for sensing the relationship of the equatorial plane of said satellite to a line between the satellite and the sun, (c) coil means mounted within said satellite paralllel to said axis for applying a torquing force to said satellite, and (d) a logic circuit connecting the outputs of said magnetic means and said photocell means to said coil means whereby said coil means will be selectively actuated in response to relationships sensed by said magnetic means and said photocell means to precess said axis to a position normal to said satellite-sun line.

4. A system for maintaining the axis of rotation of a spinning satellite substantially perpendicular to a line between the satellite and the sun comprising:

(a) magnetic sensing means mounted in said satellite for sensing the orientation of said means with respect to the earth's magnetic field, (b) first light sensing means mounted adjacent the equatorial plane of said vehicle and positioned to be activated when the sun is more than one degree above said equatorial plane, (c) second light sensing means mounted adjacent the equatorial plane and positioned to be activated when the sun is more than one degree below said equatorial plane, (d) a pair of oppositely wound coils positioned within said vehicle parallel to said axis, and (e) electronic means interposed between the outputs of each of said first light sensing means, second light sensing means and magnetic sensing means and said coils, said electronic means being responsive to the combination of a selected signal from said magnetic sensing means and a signal from one of said first and second light sensing means to produce a current in one of said coils thereby producing a corrective torque on the spin axis of said satellite to align said axis perpendicular to the satellite-sun line.

5. A system for maintaining the axis of rotation of a spinning satellite substantially perpendicular to a line between the satellite and the sun comprising:

(a) a flux gate magnetometer mounted in said satellite for sensing the orientation of a point in said satellite with the earth's magnetic field, (b) a first photocell mounted adjacent the equatorial plane of said vehicle and positioned to be activated when the sun is more than one degree above said equatorial plane, (c) a second photocell mounted adjacent the equatorial plane and positioned to be activated when the sun is more than one degree below said equatorial plane, (d) a pair of oppositely wound coils positioned within said vehicle parallel to said axis, and (e) a logic circuit connecting the outputs of each of said photocells and said magnetometer with the inputs of each of said coils, said logic circuit being responsive to the combination of a selected signal from said magnetometer and a signal from one of said photocells to produce a current in one of said coils thereby producing a corrective torque on the spin axis of said vehicle to align said axis perpendicular to the satellite-sun line.

6. A system according to claim 5 wherein each of said first and second photocells includes a silicon photodiode as the sensing element.

7. A system for maintaining the axis of rotation of a spinning satellite substantially perpendicular to a line between the satellite and the sun comprising:

(a) magnetic sensing means mounted in said satellite for sensing the orientation of said means with the earth's magnetic field;

(b) first light responsive means mounted adjacent the equatorial plane of said vehicle and positioned to be activated only when the sun is above said equatorial plane;

(c) second light responsive means mounted adjacent the equatorial plane and positioned to be activated only when the sun is below said equatorial plane;

(d) a pair of electromagnetic coils positioned within said vehicle parallel to said axis; and (e) a logic circuit including first and second gate circuits connected to receive input signals from said magnetic sensing means and said light responsive means, said first gate circuit being responsive to only positive voltages from said magnetic sensing means and said second gate circuit being responsive to only negative voltages from said magnetic sensing means, (f) a third gate circuit connected to receive signals from said first gate circuit and said first light responsive means, (g) a fourth gate circuit connected to receive signals from said second gate circuit and said first light responsive means, (h) a fifth gate circuit connected to receive signals from said first gate circuit and said second light responsive means, (i) a sixth gate circuit connected to receive signals from said second gate circuit and said second light responsive means, (j) a first univibrator connected between the outputs of said third and sixth gate circuits and one of said pair of coils to produce a timed pulse on said coil in response to the opening of one of said third and sixth gate circuits, and (k) a second univibrator connected between the outputs of said fourth and fifth gate circuits and the other of said pair of coils to produce a timed pulse on said coil in response to the opening of one of said fourth and fifth gate circuits whereby upon the opening of one of said third, fourth, fifth and sixth gate circuits one of said coils will be activated to produce a torquing force on said spin axis to precess said axis to a position normal to said satellite-sun line.

8. A system for maintaining the axis of rotation of a spinning satellite substantially perpendicular to a line between the satellite and the sun comprising:

(a) a flux gate magnetometer mounted in said satellite for sensing the orientation of said magnetometer with the earth's magnetic field;

(b) a first photocell mounted adjacent the equatorial plane of said vehicle and positioned to be activated when the sun is more than one degree above said equatorial plane;

(c) a second photocell mounted adjacent the equatorial plane and positioned to be activated when the sun is more than one degree below said equatorial plane;

(d) a pair of oppositely wound torquing coils positioned within said vehicle parallel to said axis; and (e) a logic circuit connecting the outputs of each of said photocells and said magnetometer with the inputs of each of said coils, said logic circuit including (f) first and second gate circuits connected to receive input signals from said magnetometer and said photocells, said first gate circuit benig responsive to only positive voltages from said magnetometer and said second gate circuit being responsive to only negative voltages from said magnetometer,
(g) a third gate circuit connected to receive signals from said first gate circuit and said first photocell,
(h) a fourth gate circuit connected to receive signals from said second gate circuit and said first photocell,
(i) a fifth gate circuit connected to receive signals from said first gate circuit and said second photocell,
(j) a sixth gate circuit connected to receive signals from said second gate circuit and said second photocell,
(k) a first univibrator connected between the outputs of said third and sixth gate circuits and one of said pair of coils to produce a timed pulse on said coil in response to the opening of one of said third and sixth gate circuits, and
(l) a second univibrator connected between the outputs of said fourth and fifth gate circuits and the other of said pair of coils to produce a timed pulse on said coil in response to the opening of one of said fourth and fifth gate circuits whereby upon the opening of one of said third, fourth, fifth and sixth gate circuits one of said coils will be activated to produce a torquing force on said spin axis to precess said axis to a position normal to said satellite-sun line.

9. A system according to claim 8 wherein each of said first and second photocells includes a silicon photodiode as the sensing element.

10. A system for controlling the orientation of the axis of rotation of a spinning space vehicle with respect to a line between said space vehicle and the sun comprising:
(a) first means for sensing the relationship of said space vehicle to the earth's magnetic field,
(b) second means for sensing the relationship of the equatorial plane of said space vehicle to a line between said space vehicle and the sun, and
(c) means responsive to said first and second means for positioning said space vehicle so that its axis of rotation is substantially perpendicular to a line between said space vehicle and the sun.

11. A system for controlling the orientation of the axis of rotation of a spinning space vehicle with respect to a line between said space vehicle and the sun comprising:
(a) first means for sensing the relationship of said space vehicle to the earth's magnetic field,
(b) second means for sensing the relationship of the equatorial plane of said space vehicle to a line between said space vehicle and the sun,
(c) means for providing separate signals in response to said sensed relationships, and
(d) means responsive to said signals for positioning said space vehicle so that its axis of rotation is substantially perpendicular to a line between said space vehicle and the sun.

No references cited.

FERGUS S. MIDDLETON, *Primary Examiner.*